United States Patent Office 3,231,602
Patented Jan. 25, 1966

3,231,602
SOLID REACTION PRODUCT OF HALONITRILES AND BORANES AND PROCESS FOR PREPARING THE SAME
George J. Donovan, Morristown, and Marvin M. Fein, Westfield, N.J., assignors to Thiokol Chemical Corporation, Bristol, Pa., a corporation of Delaware
No Drawing. Filed Dec. 29, 1959, Ser. No. 862,717
7 Claims. (Cl. 260—465.7)

This invention relates to solid reaction products of halonitriles and boranes.

The solid products of this invention when incorporated with suitable oxidizers such as ammonium perchlorate, potassium perchlorate, sodium perchlorate, ammonium nitrate and etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result in the use of the higher specific impulse material. The products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as pyrotechnic type igniter and are mechanically strong enough to withstand ordinary handling.

The solid reaction products of this invention are prepared by reacting a halo nitrile of an aliphatic monocarboxylic acid having from 1 to 6 carbon atoms with decaborane or a lower alkyl decaborane.

Suitable nitriles includes cyanogen chloride, cyanogen iodide, cyanogen bromide, chloroacetonitrile, chloropropionitrile, bromopropionitrile, α-chloroacrylonitrile, α - bromoacrylonitrile, α - iodoacrylonitrile, α - methyl-β-chloroarylonitrile, α-(chloromethyl)acrylonitrile, β-chloro- isobutyronitrile, trans-γ-chlorocrotononitrile, β-methyl-γ-chlorobutyronitrile, 4-chloro-3-methyl-3-butenenitrile, and the like.

Decaborane is well known to the art. Lower alkyl decaboranes such as methyldecaborane, ethyldecaborane, diethyldecaborane and propyldecaborane, can be prepared, for example, according to the method described in application Serial No. 557,634, filed January 6, 1956, to Joseph A Neff and Edward J. Wandel, now U.S. Patent No. 2,987,552.

The ratio of reactants can be varied widely, generally being in the range from 0.01 to 20 moles of halonitrile per mole of borane, preferably about 5:1. The reaction temperature can vary from 0° to 100° C. and the pressure can vary from subatmospheric to several atmospheres, although atmospheric pressure is preferred. The reaction is a substitution reaction and the degree of completeness of the reaction can be determined by the rate and quantity of hydrogen evolved. Also the rate at which solid products form and precipitate from the solution indicates the degree of completion of the reaction. The reaction to go to completion generally requires about 3 to 30 hours depending upon the ratio of reactants, the particular halonitrile and borane utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but is generally within the range of about 1 to 100 moles per mole of each reactant. When a solvent is employed, it is preferred to carry out the reaction at the reflux temperature of the solvent.

The process of the invention is illustrated in detail by the following examples which are to be considered not limitative.

EXAMPLE I

A 250 cc. three-necked glass flask was equipped with a magnetic stirrer, thermometer, and a reflux condenser having a drying tube leading to a wet test meter which monitored gas evolution. This flask was charged with 22.2 g. (0.25 mole) of chloropropionitrile, and 6.1 g. (0.05 m.) of decaborane in 100 cc. of benzene. The stirrer was then started, the reaction mixture was heated to 78° C. (reflux temperature), and gas evolution was monitored. The reaction was continued for 27.5 hours. The time, the volume of gas liberated, and changes in physical properties are shown in Table I below:

Table I

| Time | Volume (l.) | Phys. State | Time | Volume (l.) | Phys. State |
|------|-------------|-------------|------|-------------|-------------|
| 9:00 | 0.0 | Clear soln | 2:10 | 0.47 | |
| 9:30 | 0.06 | | 2:30 | 0.50 | Brown soln. |
| 10:00 | 0.20 | Turning yellow | 3:00 | 0.54 | |
| 10:30 | 0.25 | | 3:30 | 0.55 | |
| 11:30 | 0.30 | Yellow soln | 4:00 | 0.57 | |
| 12:00 | 0.35 | | 4:30 | 0.62 | |
| 12:30 | 0.39 | | 8:30 | 1.25 | Brown solids formed. |
| 1:00 | 0.42 | Darker soln | 10:00 | 1.32 | |
| 1:30 | 0.45 | | 12:30 | 1.35 | |

A total of 1.35 liters of gas identified as hydrogen was liberated. This is about 0.05 mole and corresponds favorably with the 1.21 liters of hydrogen theoretically obtained by the substitution reaction of two moles of chloropropionitrile and one mole of decaborane.

The reaction mixture was filtered and after extraction of the solid and subsequent drying the product weighed 1.0 grams.

EXAMPLE II

In a 250 ml. flask, 22.2 g. (0.25 mole) of chloropropionitrile and 6.1 g. (0.05 mole) of decaborane in 100 cc of benzene were heated for 27 hours at 78° C. The solution became dark in color and 1.28 liters of gas were liberated. The solution was concentrated by aspiration leaving a red viscous liquid which was extracted several times with pentane. It was then dried in a vacuum oven at 40° C. and a dark solid mass formed. Weight of product 12.3 g.

EXAMPLE III

In a 500 ml. flask, 44.4 g. (0.5 mole) of chloropropionitrile and 12.2 g. (0.1 mole) of decaborane were heated in 200 cc. of benzene for 27 hours at 78° C. The solution became dark in color and 2.54 liters of gas (0.1 mole) were liberated. The solution was concentrated by aspiration and there remained a dark viscous oil which was washed with pentane and placed in a vacuum oven at 40° C. overnight. A red solid weighing 28 g. and melting at 126° C. with decomposition remained after drying. Infrared spectrum of the product was consistent with that for the reaction product $(ClC_2H_4CN)_2H_{10}H_{12}$.

Elemental analysis was as follows for $B_{10}H_{20}C_6Cl_2N_2$: Calculated, Cl=23.7%. Found, Cl=23.7%.

The boron containing solid materials produced by practicing the methods of this invention can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportion being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,662,277 to Bonnell and U.S. Patent 2,646,596 to Thomas.

The reaction products of halonitriles and decaborane of this invention can also be employed as monomers for condensation polymerization.

We claim:
1. A process for the preparation of reaction products of halonitriles and boranes which comprises reacting from 0.01 to 10 moles of a halonitrile selected from the group consisting of chloroacetonitrile, chloropropionitrile, bromopropionitrile, α-chloroacrylonitrile, α-bromoacrylonitrile, α-iodoacrylonitrile, α-methyl-β-chloroacrylonitrile, α-(chloromethyl)acrylonitrile, β-chloroisobutyronitrile, trans-γ-chlorocrotononitrile, β-methyl-γ-chlorobutyronitrile and 4-chloro-3-methyl-3-butenenitrile, at a temperature of 0° to 100° C., for a period of 3 to 30 hours, with a borane selected from the group consisting of decaborane and lower alkyl decaboranes, and isolating the reaction products contained therein.

2. The process of claim 1 wherein the reaction is conducted in the presence of a solvent inert with respect to the reactants.

3. A process for the preparation of solid reaction products of halonitriles and decaborane which comprises reacting from about 3 to 8 moles of a halonitrile per mole of decaborane for from about 5 to 30 hours in the presence of benzene at a temperature of about 20–85° C., the halonitrile being selected from the group consisting of chloroacetonitrile, chloropropionitrile, bromopropionitrile, α-chloroacrylonitrile, α-bromoacrylonitrile, α-iodoacrylonitrile, α-methyl-β-chloroacrylonitrile, α-(chloromethyl)acrylonitrile, β-chloroisobutyronitrile, trans-γ-chlorocrotononitrile, β-methyl-γ-chlorobutyronitrile and 4-chloro-3-methyl-3-butenenitrile, and isolating the reaction products contained therein.

4. The process of claim 3 in which the halonitrile is chloropropionitrile.

5. The process of claim 4 in which the reaction is carried out at benzene reflux temperatures.

6. The product produced by reacting a halonitrile selected from the group consisting of chloroacetonitrile, chloropropionitrile, bromopriopionitrile, α-chloroacrylonitrile, α-bromoacrylonitrile, α-iodoacrylonitrile, α-methyl-β-chloroacrylonitrile, α-(chloromethyl)acrylonitrile, β-chloroisobutyronitrile, trans-γ-chlorocrotononitrile, β-methyl-γ-chlorobutyronitrile and 4-chloro-3-methyl-3-butenenitrile, with a borane selected from a group consisting of decaborane and lower alkyl decaboranes, in the presence of an inert solvent selected from group consisting of n-pentane, hexane, heptane, benzene, toluene, xylene, cyclohexane, methylcyclopentane, dioxane, ethyl acetate and diisopropyl ether, at reflux, for a period of time ranging between 3 to 30 hours, said ratio of halonitrile to borane being about 5:1.

7. The product of claim 6 wherein the halonitrile is chloropropionitrile.

References Cited by the Examiner

Schechter et al.: "Boron Hydrides and Related Compounds," 2nd ed., May 1954, Callery Chemical Co., p. 26. (Copy in Scientific Library.)

CHARLES B. PARKER, *Primary Examiner*.

L. D. ROSDOL, *Examiner*.